No. 611,613. Patented Oct. 4, 1898.
J. R. DOTY & T. E. DOLLAHAN.
GRAIN TRUCK.
(Application filed May 25, 1897.)
(No Model.) 2 Sheets—Sheet 1.
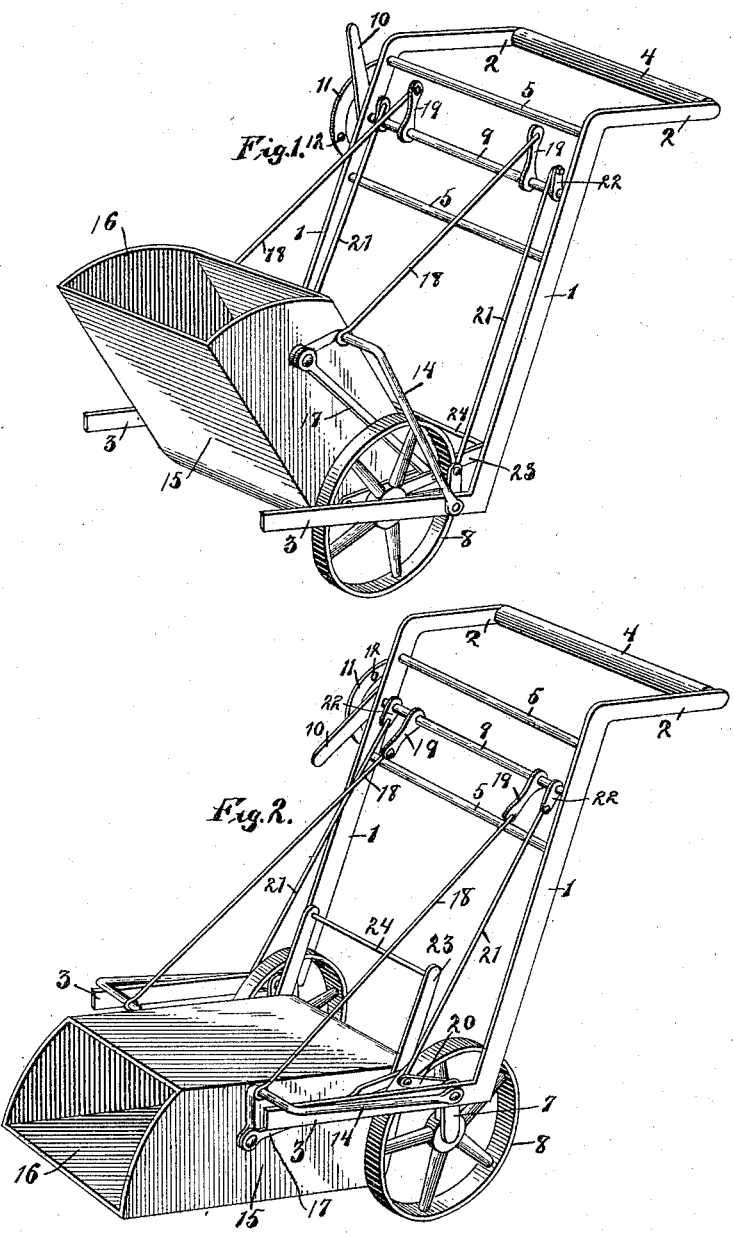
Witnesses
C. D. Heinrichs
Victor J. Evans
Inventors
James R. Doty, Thomas E. Dollahan
By John Wedderburn.
Attorney No. 611,613. Patented Oct. 4, 1898.
J. R. DOTY & T. E. DOLLAHAN.
GRAIN TRUCK.
(Application filed May 25, 1897.)
(No Model.) 2 Sheets—Sheet 2.
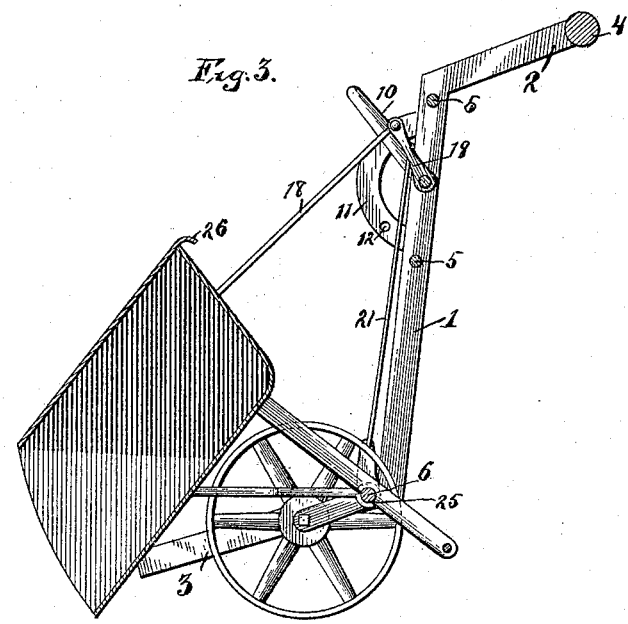
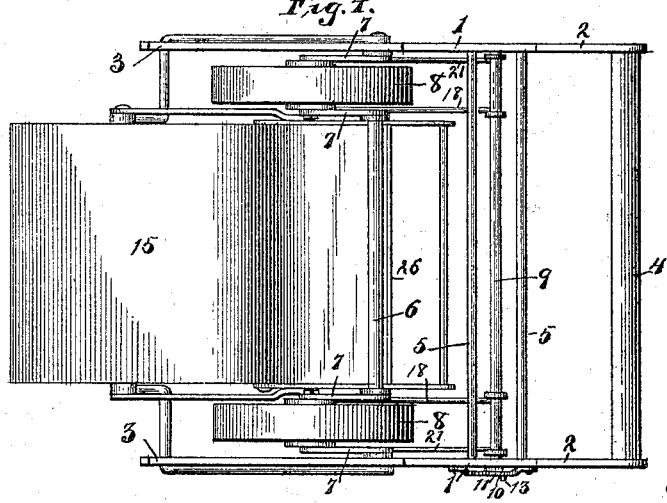
Witnesses
L. D. Heinrichs
Victor J. Evans
Inventors
James R. Doty, Thomas E. Dollahan
By John Wedderburn
Attorney

UNITED STATES PATENT OFFICE.

JAMES R. DOTY AND THOMAS E. DOLLAHAN, OF BIRDS, ILLINOIS.

GRAIN-TRUCK.

SPECIFICATION forming part of Letters Patent No. 611,613, dated October 4, 1898.

Application filed May 25, 1897. Serial No. 638,055. (No model.)

*To all whom it may concern:*

Be it known that we, JAMES R. DOTY and THOMAS E. DOLLAHAN, of Birds, in the county of Lawrence and State of Illinois, have invented certain new and useful Improvements in Grain-Carts; and we do hereby declare the following to be a full, clear, and exact description of the invention, such as will enable others skilled in the art to which it appertains to make and use the same.

This invention relates to improvements in grain-carts, and has special reference to providing a cart which may be automatically loaded and quickly and readily dumped for depositing the grain at the desired place.

The invention consists in the novel features of construction hereinafter fully described and claimed, and illustrated by the accompanying drawings, in which—

Figure 1 is a perspective view of our invention with the body or scoop in a raised position for carrying the grain to the desired place. Fig. 2 is a similar view showing the scoop lowered ready for loading. Fig. 3 is a central longitudinal section showing the scoop in position for dumping. Fig. 4 is a bottom plan view.

Referring to the accompanying drawings, 1 indicates the side pieces, which are inclined upwardly and rearwardly and have the straight portions 2 and 3 at their upper and lower ends, respectively. The upper extremity of the side pieces are united by the handle 4 and are provided with transverse rods 5, which connect their inclined portions adjacent their upper ends. Pivoted between the straight portions 3, formed at the lower end of the frame and adjacent their inner ends, is the axle 6, provided with the cranks 7 adjacent its ends and within the frame. Journaled to these cranks are the supporting-wheels 8, by means of which the cart may be conveniently moved from place to place.

Pivoted between the side pieces of the frame, adjacent their upper ends, is the shaft 9, provided on one end with the hand-lever 10. Secured to the outer surface of one of the side pieces and adjacent to the hand-lever is a curved plate 11, having the perforations 12 formed therein on opposite sides of its center, said perforations adapted to receive a pin 13, projecting from the hand-lever, whereby said lever may be held in a raised or depressed position.

Secured to the opposite ends of the axle are the upwardly and forwardly extending arms 14, which are pivoted at their opposite ends to the scoop 15, having its outer end open, as illustrated at 16. Pivoted also to each side of the scoop are the rods or links 17, which are pivoted at their opposite ends to the axle. Pivoted to the arms 14 on opposite sides of the scoop are the rods 18, which at their opposite ends are pivoted to the arms 19, secured to the shaft 9. Secured to the axle are the arms 20, to the free end of which are pivoted the rods 21, the opposite ends of said rods being pivoted to the arms 22, which are secured to the shaft 9. Thus it will be understood that when the hand-lever is operated the scoop will be moved through the medium of the connecting-rods and the crank-axle.

When it is desired to load the cart with grain, the same is moved adjacent the grain pile. The hand-lever is then moved downwardly until the scoop rests on or near the ground. The cart is then moved forward until it is one-third of its length in the grain, when by bearing down upon the handle and at the same time pushing the cart forward the scoop will be automatically filled with grain. The hand-lever is then returned to the rear pole or carrying position.

For dumping the scoop we provide a yoke-shaped frame comprising the arms 23, which are pivoted at their inner ends on opposite sides of the scoop 15 and are connected at their outer ends by the rod 24. These arms are provided with the notches 25 intermediate their ends, which are adapted to engage the axle when the cart is in its normal position. The upper wall of the scoop is elongated at its inner end and curved to form a stop 26, which is adapted to normally rest upon the axle and prevent the downward movement of the rear end of said scoop. When it is desired to dump the scoop, the arms 23 are raised and drawn rearwardly through the medium of the connecting-rod 24 as a handle and the scoop moved to the position illustrated in Fig. 3. By reason of the scoop being pivoted adjacent its upper end and said arms being attached adjacent its opposite end its dumping is readily effected.

While we have here shown and described our invention as a grain-cart, yet it will be understood that the same might be used as a scraper and that the cart may be drawn by horses, as desired, without in any way departing from the spirit of our invention.

Having thus described our invention, what we claim, and desire to secure by Letters Patent, is—

1. The combination with a frame, of a crank-axle mounted therein, supporting-wheels upon the crank portions of said axle, a receptacle on said frame, means for rotating said axle, and connections between said axle and said receptacle, whereby upon the rotation of the former said receptacle is tilted and the frame upon which said receptacle is mounted, is lowered.

2. The combination with a frame, of a crank-axle mounted therein, supporting-wheels upon the crank portions of said axle, a pivotally-mounted receptacle on said frame, and connections between said axle and said receptacle, whereby the former may be rotated, the latter tilted and the frame upon which it is mounted, lowered.

3. The combination with a frame, of a crank-axle mounted therein, supporting-wheels upon the crank portions of said axle, a receptacle, connections between said receptacle and said axle, whereby the former is turned upon the rotation of the latter, and means for rotating said axle.

4. The combination with a frame, of a crank-axle mounted therein, supporting-wheels upon the crank portions of said axle, supplemental cranks on said axle, a pivotally-mounted receptacle, a counter-shaft, crank-arms thereon, and connections between the respective crank-arms on said counter-shaft and the supplemental cranks on said axle, and said receptacle, whereby, when said counter-shaft is rotated, said axle will be turned, said receptacle will be tilted and the frame in which it is mounted will be lowered, as and for the purpose set forth.

5. The combination of a frame, a crank-axle journaled therein, supporting-wheels journaled to the cranks of said axle, arms pivoted to the axle, a receptacle pivoted to said arms, a shaft journaled in said frame, operative connections between said arms and said shaft, and an operating-lever for rotating said shaft to effect the movement of the receptacle, substantially as set forth.

6. The combination of a frame, a crank-axle, wheels journaled on the cranks of said axle, arms secured at one end to the ends of the axle, a scoop or receptacle open at its outer end and pivoted between the opposite ends of said arms, rods or links pivoted at one end to the opposite sides of the scoop, and at their opposite ends pivoted to the axle, a shaft journaled in the frame, rods pivoted at one end to the arms, and at their opposite ends pivoted to crank-arms on said shaft, and an operating-lever for rotating said shaft and effecting the movement of the scoop, substantially as set forth.

7. The combination of a frame, comprising side bars inclined upwardly and rearwardly, having their upper and lower ends extending parallel, a handle connecting the upper ends of said side pieces, a crank-axle journaled between the lower ends of the side pieces, supporting-wheels journaled on the cranks of said axle, arms secured on the opposite ends of the axle and extending forwardly from the frame, a scoop pivoted between the outer ends of said arms, rods or links pivoted at one end to opposite sides of the scoop and at their opposite ends to the axle, an arm secured to the axle, a shaft journaled between the side pieces of the frame, a rod pivoted at one end to the arm on the axle, a short arm upon the shaft to which the opposite end of the rod is pivoted, rods pivoted to the arms between which the scoop is pivoted, arms secured upon the shaft to which the opposite ends of said rod are pivoted, a curved plate secured to one of the side pieces, provided with perforations, and an operating-lever secured to said shaft and carrying a pin which is adapted to project through the perforations of said plate to secure the lever in the proper position, substantially as set forth.

8. The combination of a supporting-frame, wheels supporting the same, a scoop or receptacle pivoted in said frame, arms pivoted to opposite sides of the receptacle and notched to normally engage the axle, and a stop formed on said receptacle adapted to engage the axle to prevent the downward movement thereof, substantially as set forth.

9. The combination with a supporting-frame, an axle therein, and wheels on said axle, of arms pivoted to said axle, a scoop pivotally mounted in the upper ends of said arms, and a dumping-frame pivoted to the scoop and adapted to bear against said axle.

10. The combination with a supporting-frame, an axle therein, and wheels on said axle, of arms pivoted to said axle, a scoop pivotally mounted in the upper ends of said arms, and a dumping-frame pivoted to the scoop and adapted to bear against said axle, the said dumping-frame comprising parallel arms provided with notches or recesses in which the axle is adapted to fit and with a cross-bar connecting the rear ends of said arms.

In testimony whereof we have signed this specification in the presence of two subscribing witnesses.

JAMES R. DOTY.
THOS. E. DOLLAHAN.

Witnesses:
J. C. REYNOLDS,
O. M. HIGHSMITH.